Dec. 7, 1943.　　　M. C. TAYLOR　　　2,336,045
AMALGAM DECOMPOSITION
Filed Feb. 14, 1941
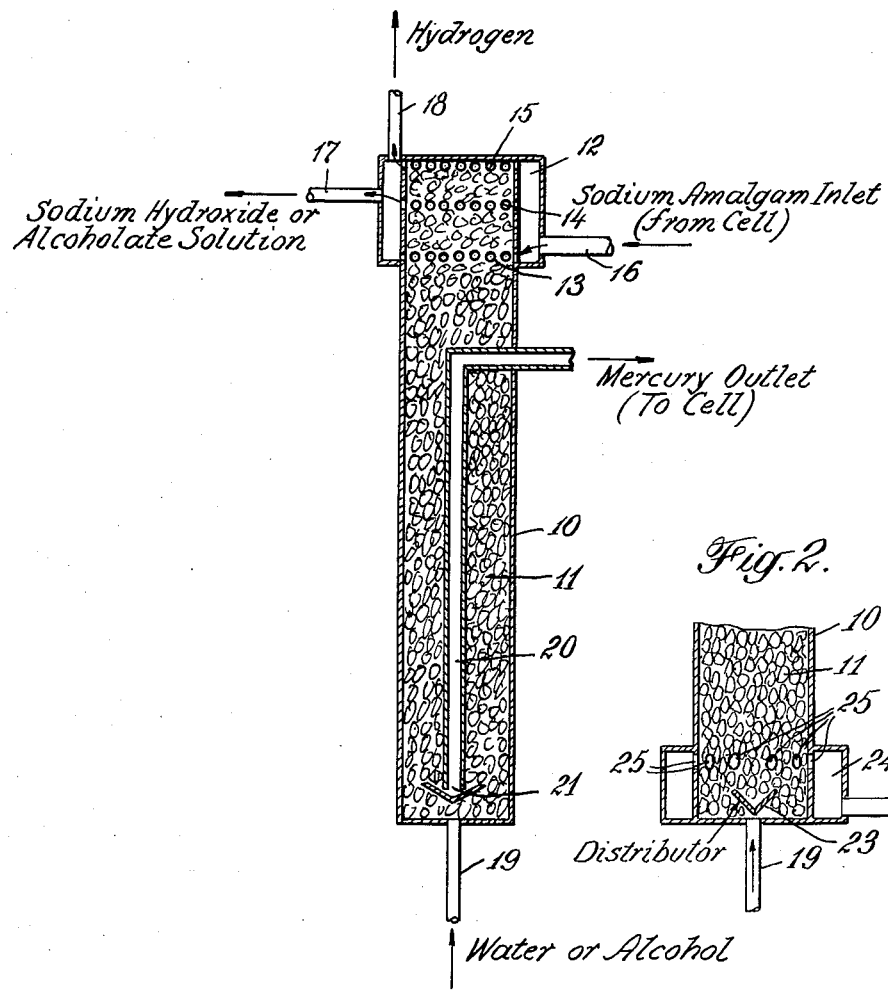
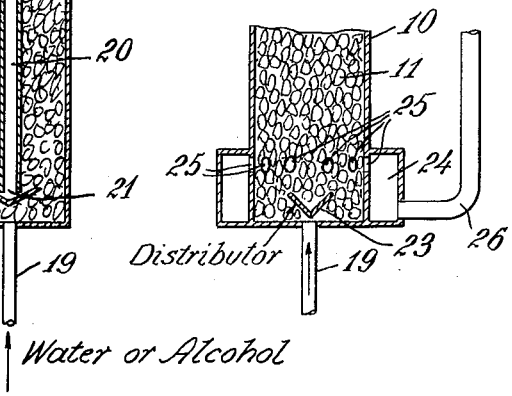
INVENTOR
Maurice C. Taylor
BY
ATTORNEYS Patented Dec. 7, 1943

2,336,045

UNITED STATES PATENT OFFICE 2,336,045

AMALGAM DECOMPOSITION

Maurice C. Taylor, Niagara Falls, N. Y., assignor to The Mathieson Alkali Works, Inc., New York, N. Y., a corporation of Virginia Application February 14, 1941, Serial No. 378,917

5 Claims. (Cl. 204—72)

This invention is concerned with the decomposition of alkali metal amalgam in the presence of water or an alcohol having less than four carbon atoms to form alkali metal hydroxide or alcoholate.

I have discovered that the decomposition of amalgam of sodium, potassium or lithium with water or alcohols having less than four carbon atoms is facilitated to a pronounced degree if the amalgam and the water or alcohol are passed through a tower containing a decomposition electrode in the form of a packing of electrically conductive material with which mercury does not amalgamate substantially and which is preferentially wetted by the water or alcohol, under conditions such that the packing is submerged in the amalgam and the water or alcohol forms a thin moving film on the packing and travels countercurrent to the amalgam through the tower.

Thus my invention contemplates, in a process involving reaction of alkali metal from amalgam with a liquid selected from the group consisting of water and alcohols having less than four carbon atoms per molecule, the improvement which comprises passing the amalgam and liquid in countercurrent contact with each other through a space containing an electrode in the form of a packing of electrically conductive material with which mercury or the amalgam does not amalgamate substantially and which is preferentially wetted by the liquid so that the liquid forms a thin moving film on the packing. Preferably, the packing is in such form that it provides a plurality of tortuous passages or channels, the walls of which are defined by the packing itself. In operating this process, the liquid preferably is passed upwardly in the tower while the amalgam is passed downwardly, and improved results are obtained if the packing is flooded by a downwardly moving stream of mercury or amalgam through which the liquid passes in countercurrent.

My invention further contemplates, in apparatus for reacting alkali metal from an amalgam thereof with a liquid selected from the group consisting of water and alcohols having less than four carbon atoms per molecule, the combination which comprises a tower, an electrode disposed in the tower and consisting of packing providing a plurality of passages through the tower and formed of electrically conductive material with which mercury does not amalgamate substantially and which is preferentially wetted by the liquid, a conduit for admitting the amalgam to the tower, another conduit for admitting the liquid to the tower, a third conduit for withdrawing mercury from the tower, a fourth conduit for withdrawing hydrogen gas from the tower and a fifth conduit for withdrawing the liquid product of the reaction of the alkali metal and the liquid from the tower. The packing, conveniently, may be of graphite. Preferably, the amalgam is admitted to the tower adjacent the top thereof while the liquid is admitted adjacent the bottom of the tower. The mercury in such case should be withdrawn from a lower portion of the tower, preferably through a conduit the outlet of which is substantially lower than the inlet of the conduit for mercury into the tower. The conduit for withdrawing hydrogen gas preferably communicates with the tower adjacent the top thereof and the conduit employed for withdrawing the liquid product of the alkali metal and the liquid (alkali metal hydroxide or alcoholate solution) preferably communicates with the tower near the top thereof.

In the preferred form of my apparatus, there is an annular chamber around the upper portion of the tower. Communication between this annular chamber and the tower is afforded by means of apertures in the tower wall, at three or more different levels. With such an apparatus the amalgam may flow from the annular chamber into the tower through the lowest of the three levels, with hydrogen flowing from the tower into the chamber at the uppermost level and with hydroxide or alcoholate solution flowing into the annular chamber at an intermediate level.

A preferred practice of my invention is described in detail hereinafter with reference to the accompanying Figure 1 which is a diagrammatic vertical section of a tower through which sodium amalgam and water are passed in countercurrent.

Fig. 2 illustrates a modified form of the apparatus of Fig. 1 provided with an improved means for withdrawing mercury.

The tower of Fig. 1 comprises a vertically disposed shell 10 of uniform cross section. The shell may be constructed of any material that is not attacked by the materials passing therethrough. Thus, the shell may be in the form of a hollow cylinder of iron or ceramic closed at both ends. The shell is packed throughout with electrode material 11 that is electrically conductive, non-amalgamating and preferentially wetted by the water or alcohol. Graphite is a suitable material and in the apparatus illustrated the packing is formed of irregular shaped pieces of graphite about ⅜ inch in size. The interstices between the pieces form a plurality of tortuous passages from top to bottom of the tower.

The upper portion of the tower is surrounded by a closed annular chamber 12 that communicates with the interior through three rows 13, 14, 15 of holes drilled through the shell at different elevations. The holes are smaller than the pieces of packing and, conveniently, may be about $\tfrac{1}{16}$ or $\tfrac{3}{32}$ inch in diameter. A conduit 16 for introducing sodium amalgam to be decomposed is connected to the annular chamber near the bottom thereof adjacent the lowermost row 13 of holes. A second conduit 17 for withdrawing the product (say, sodium hydroxide solution) is connected to the side of the annular chamber at approximately the level of the intermediate row 14 of holes and a third conduit 18 for withdrawing hydrogen is connected to the top of the annular chamber above the upper row 15 of holes.

The liquor (say, water) to be reacted with the amalgam is introduced into the bottom of the tower through an inlet pipe 19. The liquid must be introduced under a pressure sufficient to overcome the head of the contents of the tower and a pump (not shown) may be employed to force the liquid into the tower.

Mercury from which the sodium has been removed is withdrawn from the lower portion of the tower through a riser pipe 20 that passes upwardly through the tower to a point below the annular chamber and thence through the shell. An inverted collector cone 21 is disposed below the riser and serves as a well in which the mercury collects prior to withdrawal through the riser. The cone also serves as a seal to prevent water from entering the riser and leaving with the spent amalgam and as a distributor to cause the water entering through the inlet pipe 19 to spread throughout the cross section of the tower.

In the operation of the apparatus, sodium amalgam from an electrolytic cell, not shown, or other suitable source is admitted into the lower portion of the annular chamber and flows through the lowermost holes into the interior of the tower. Sufficient amalgam is introduced into the tower to flood it, that is, to submerge the packing. Water or alcohol is forced into the bottom of the tower under pressure sufficient to overcome the head of amalgam in the tower. The water or alcohol is lighter than the amalgam and mercury and tends to rise in the tower countercurrent to the amalgam flow. Reaction takes place between the amalgam and the water or alcohol so that as the amalgam travels down the tower it loses its sodium content until it is substantially mercury where it collects in the well to be withdrawn through the riser. The reaction between the water or alcohol and the sodium of the amalgam produces sodium hydroxide or sodium alcoholate, as the case may be, together with hydrogen gas. The hydrogen gas and the resulting solution of sodium hydroxide in water or sodium alcoholate in alcohol both rise toward the top of the tower. The hydrogen rises to the uppermost row of holes and passes therethrough into the upper portion of the annular chamber from which it is withdrawn. Sodium hydroxide or alcoholate solution passes through the intermediate row of holes into the annular chamber and thence is withdrawn into the conduit provided for this purpose.

Since the water or alcohol preferentially wets the surface of the graphite electrode packing, it follows a path which takes the form of an upwardly moving thin film of solution on the electrode surfaces. This film moving up through the tower decomposes the amalgam in a most efficient way since the film is continuously replenished. The violent evolution and rise of hydrogen inside the tower tends to carry the amalgam as well as the other fluids in an upward direction. However, this tendency may be overcome by employing a tower of relatively large cross section in order to give more space for the escape of hydrogen or by increasing the head of amalgam on the tower.

The means provided for withdrawing the mercury from the tower is particularly suitable since it insures that the tower packing will always be flooded with mercury or amalgam. The height of the sodium amalgam inlet above the mercury outlet represents the head required to force the amalgam countercurrent through the rising hydrogen and solution of hydroxide or alcoholate.

Fig. 2, which is a fragmentary vertical section through the lower portion of a tower similar to that of Fig. 1, shows a preferred means for withdrawing mercury from the tower. Water or alcohol to be reacted with the amalgam is, as in the case of the apparatus of Fig. 1, introduced into the tower through the inlet pipe 19 in the bottom thereof and is distributed throughout the tower cross section by an inverted cone 23 disposed immediately above the inlet. An annular jacket 24 is disposed around the lower portion of the tower. Mercury enters this jacket through a row of holes 25 in the upper portion thereof and is withdrawn through an upwardly extending riser pipe 26 that communicates with a lower portion of the jacket, which acts as a seal to prevent the water or alcoholate from escaping with the mercury. Otherwise, the apparatus partially illustrated by Fig. 2 is the same as that of Fig. 1.

It should be noted that in practically every case the packing will have specific gravity lower than that of the mercury or the amalgam, so that there will be a tendency to buoy the packing upwardly. If the packing is composed of a plurality of pieces, which is the more convenient form, it should have sufficient mechanical strength to resist crumbling and should be so confined in the tower that it will not crowd into the upper portion thereof to the extent that it interferes with flow through the tower.

I claim:

1. In a process involving reaction of alkali metal from amalgam with a liquid selected from the group consisting of water and alcohols having less than four carbon atoms per molecule, the improvement which comprises passing the amalgam and liquid in countercurrent contact with each other through a space containing an electrode in the form of a packing of electrically conductive material with which mercury does not amalgamate substantially and which is preferentially wetted by the liquid, the packing being maintained submerged in a pool of the amalgam, and the liquid moving through the amalgam and passing over the packing in the form of a thin film.

2. In a process involving reaction of alkali metal from amalgam with a liquid selected from the group consisting of water and alcohols having less than four carbon atoms per molecule, the improvement which comprises passing the amalgam and liquid in countercurrent contact with each other through tortuous passages in an electrode in the form of a packing of electrically conductive material with which mercury does not amalgamate substantially and which is preferentially wetted by the liquid, the packing being maintained submerged in a pool of the amalgam, and the liquid moving through the amalgam in the form of a thin film on the walls of the passages defined by the packing.

3. In a process involving reaction of alkali metal from amalgam with a liquid selected from the group consisting of water and alcohols having less than four carbon atoms per molecule, the improvement which comprises passing the amalgam and liquid in countercurrent contact with each other through a tower containing an electrode in the form of a packing of pieces of electrically conductive material with which mercury does not amalgamate substantially and which is preferentially wetted by the liquid, the packing being maintained submerged in a pool of the amalgam, the amalgam in the pool moving downwardly through the tower, and the liquid moving upwardly through the downwardly-moving amalgam and over the packing in the form of a thin film.

4. In a process involving reaction of alkali metal from amalgam with a liquid selected from the group consisting of water and alcohols having less than four carbon atoms per molecule, the improvement which comprises passing the amalgam and liquid in countercurrent contact with each other through a tower packed with pieces of graphite, which form tortuous passages therethrough, while the pieces of graphite are maintained submerged in a pool of the amalgam, the liquid moving through the amalgam in the form of a thin film on the walls of the tortuous passages formed by the pieces of graphite.

5. In a process involving reaction of alkali metal from amalgam with a liquid selected from the group consisting of water and alcohols having less than four carbon atoms per molecule, the improvement which comprises passing the amalgam and liquid in countercurrent contact with each other through a plurality of channels in a packing of electrode material which is electrically conductive and with which mercury does not amalgamate substantially but which is preferentially wetted by the liquid under conditions such that the liquid forms a thin moving film on the packing, the packing being maintained submerged in a downwardly moving pool of amalgam through which the liquid passes in countercurrent.

MAURICE C. TAYLOR.